United States Patent [19]

Haigh et al.

[11] Patent Number: 4,480,382
[45] Date of Patent: Nov. 6, 1984

[54] FEED MEANS FOR ELONGATE ARTICLES

[75] Inventors: Leonard Haigh, Evesham; Robert H. Morrison, Wimborne, both of England

[73] Assignee: Needle Industries Limited, Studley, England

[21] Appl. No.: 401,313

[22] Filed: Jul. 23, 1982

[30] Foreign Application Priority Data

Jul. 25, 1981 [GB] United Kingdom ............... 8123017

[51] Int. Cl.$^3$ ...................... B23P 21/00; B23P 19/00; B65G 47/24
[52] U.S. Cl. ........................................ 29/786; 29/792; 198/416
[58] Field of Search .................. 198/416; 29/786, 785, 29/787, 791, 792, 793, 795

[56] References Cited

U.S. PATENT DOCUMENTS

| | | | |
|---|---|---|---|
| 1,250,047 | 12/1917 | Swanson | 198/416 |
| 3,831,738 | 8/1974 | Aidlin et al. | 198/416 |
| 4,271,579 | 6/1981 | McDonald et al. | 29/792 |

*Primary Examiner*—Howard N. Goldberg
*Assistant Examiner*—Steven E. Nichols

*Attorney, Agent, or Firm*—Arnold, White & Durkee

[57] ABSTRACT

A feed means for feeding elongate articles of the type described in succession and in a predetermined orientation to a receiving station, the feed means including an inclined track comprising a pair of parallel shoulders affording a slot therebetween so that, in use, a head of an article of the type described can be supported on the shoulders with its shank depending downwardly through the slot and, at the lower end of the slot, there being a rotatable feed member having a helical groove of such configuration as to permit a lowermost article in the track to enter the groove and be transported transversely away from the track between the feed member and the lower end of the track, wherein a drive means is provided to rotate the feed member unidirectionally at a speed of at least 300 r.p.m. so that the lowermost article is subjected to a frictional force having a component generally parallel to the longitudinal axis of the shank of a magnitude to cause relative movement between the lowermost article and the next adjacent article in the longitudinal direction of their shanks and thereafter to transport the thus engaged article in a direction transverse to the axis of the shank.

14 Claims, 3 Drawing Figures

FEED MEANS FOR ELONGATE ARTICLES

BACKGROUND OF THE INVENTION

1. Field of the Invention

This invention relates broadly to a feed means for feeding elongate articles hereinafter referred to as the type described, comprising an elongate shank having an enlarged head at or adjacent one end thereof, the feed means feeding said articles in succession and in a predetermined orientation at high speed to a receiving station. By high speed we mean at least 300 articles per minute and preferably at least 1000 articles per minute. More particularly, but not exclusively, the invention relates to a machine for assembling blind rivets comprising a hollow, headed, rivet and a headed mandrel incorporating a feed means for feeding at high speed the headed mandrels in succession and in a predetermined orientation to a receiving station of the machine.

2. Description of the Prior Art

Hitherto elongate articles of the type described have been fed by a feed means comprising a disc having a plurality of notches in its periphery and the articles being fed to the periphery of the wheel for entry into successive notches along a suitably inclined track. Such a feed means has been found to be not entirely satisfactory due to a tendency for the heads of the articles to wedge together due to the weight of articles in the track and because entry of articles into a notch is dependent solely upon the force of gravity. In addition, if an article is bent then part of the length of the article can engage in a notch of the disc and another part remain engaged with the track causing jamming of the feed means.

DE No. 182,407 is a proposal, never put into practice so far as the Applicants are concerned, for an alternative form of feed means which is capable of operation only at low speeds, i.e. speeds of less than 300 articles per minute. The German Specification discloses feed means for feeding elongate articles in succession and in a predetermined orientation to a receiving station and includes an inclined track comprising a pair of parallel shoulders affording a slot therebetween so that, in use, a head of an article of the type described can be supported on the shoulders with its shank depending downwardly through the slot and, at the lower end of the slot, there being a rotatable feed member having a helical groove of such configuration as to permit a lowermost article in the track to enter the groove and be transported transversely away from the track between the feed member and the lower end of the track.

It is self evident to persons skilled in the art that the machine described in the German Specification is incapable of operating at feed rates suitable for modern industrial practice feeding at least 300 articles per minute. The reasons which would lead persons skilled in the art to this conclusion include the reliance on gravity feed, the use of a reciprocating linkage which precludes practical operation at high speeds and the fact that at the turn of the Century rates of production generally were not such as to lead a skilled person to expect a feed rate of at least 300 articles per minute.

SUMMARY OF THE INVENTION

It is accordingly an object of the invention to provide a new and improved feed means for feeding elongate articles of the type described in succession and in predetermined orientation at high speed to a receiving station whereby the above problems are overcome or are reduced. A further object of the invention is to provide a machine for assembling blind rivets comprising a hollow, headed, rivet and a headed mandrel incorporating such an improved feed means.

According to one aspect of the invention we overcome the shortcomings of the feed means of the German Specification and of the feed means commonly in use today described above by providing a drive means to rotate the feed member unidirectionally at a speed of at least 300 r.p.m. so that the lowermost article is subjected to a frictional force having a component generally parallel to the longitudinal axis of the shank of a magnitude to cause the relative movement between the lowermost article and the next adjacent article in the longitudinal direction of their shanks and thereafter to transport the thus engaged article in a direction transverse to the axis of the shank.

Because of the high speed of rotation of the feed member, frictional force between the article and the regions of the feed member between the grooves creates sufficient frictional force on the lowermost article to cause said relative movement so that the lowermost article is at least partly disengaged from the track and a next following article before the lowermost article becomes aligned with the groove.

An abutment surface may be provided adjacent the feed member downstream of the track of such configuration as to cause the articles to rotate circumferentially around the axis of rotation of the feed member from the orientation they have when first engaged with the feed member to an orientation in which the shanks of the articles lie in a generally horizontal plane.

The abutment surface may provide an edge extending in a generally horizontal plane from a position adjacent the end of the track in a direction inclined transversely and longitudinally of the feed member to a position on the transversely opposite side of the feed member to the track.

The last turn of the groove of the feed member may be circular so that whilst an article is engaged with the last turn it is not transported in said transverse direction.

According to another aspect of the invention we provide a machine for assembling a blind rivet comprising a hollow rivet and a mandrel comprising an elongate shank with a head at one end, said machine including a feed means comprising an inclined track comprising a pair of parallel shoulders affording a slot therebetween so that, in use, a head of a mandrel is supported on the shoulders with its shank depending downwardly through the slot and, at the lower end of the track, a feed member mounted for rotation about an axis transverse to the direction of feed of the mandrels along the track and having a helical groove therein of such configuration as to permit a mandrel to enter the groove and to be transported along the groove between the feed member and the lower end of the track in a transverse direction and there being an abutment surface adapted to engage a mandrel to move the mandrel from the orientation it has when it becomes engaged with the feed member to a generally horizontal orientation at a receiving station to which it is transported by the feed member, means to feed in succession a plurality of said hollow rivets to an assembly station, and means to move a mandrel in its axial direction out of engagement with the feed member and into a hollow rivet presented thereto at the assembly station.

Drive means may be provided to rotate the feed member unidirectionally at a speed of at least 300 r.p.m. so that the lowermost article is subjected to a frictional force having a component generally parallel to the longitudinal axis of the shank to cause relative movement between the lowermost article and a next adjacent article in the longitudinal direction of their shanks and thereafter to transport the thus engaged article in a direction transverse to the axis of the shank.

The means for feeding the hollow rivets may feed the rivets so that they are presented at the assembly station with their hollow bores extending in a horizontal direction normal to the feed member.

The last turn of the groove of the feed member may be circular so that whilst a mandrel is engaged with the last turn it is not transported in said transverse direction and hence remains in a position so as to be aligned with a rivet and to permit it to be driven into the rivet, for example by means of a reciprocating hammer.

Guide means may be provided to engage the mandrel at the receiving station to guide the mandrel whilst it is driven into the rivet.

The end turn of the groove may have only one side wall on the upstream side of the groove, said guide means engaging the mandrel on the downstream side thereof to cause the mandrel to be guided between the guide means and said upstream side wall so that the shank of the mandrel extends in a horizontal plane and in a plane perpendicular to the axis of rotation of the feed member for driving into the rivet.

The guide means may be reciprocable into and out of engagement with a mandrel so as to be moved out of engagement with the mandrel as the head of the mandrel is moved past the guide member towards the rivet.

The guide means may be reciprocated by link means driven from a cam provided in the drive to the feed member.

The groove may be formed in a cylindrical surface of the feed member or alternatively the groove may be formed between helical ribs provided on the feed member.

The portion of the groove which becomes aligned with the lower end of the track and receives the lowermost article mould may be widened locally to permit of the article entering the groove whilst being orientated at 90° to the longitudinal axis of the feed member and hence not aligned with the helix angle of the groove. This widened section of the groove also creates a tapered lead to the head of the article/mould as the groove becomes aligned with the lower end of the track and particularly at slow speeds i.e. towards 300 r.p.m., the wedging affect thereby created provides an increased frictional force between the article and the member thereby increasing the force tending to move the lowermost article relative to the next adjacent article in their longitudinal directions.

The feed means of the present invention ensures consistent feeding of the articles at high speed particularly because of the frictional force imposed upon the lowermost article as a result of the feed member rotating unidirectionally at high speed. Because the feed member rotates in a single direction, it always applies a frictional force to the lowermost article in the direction to lift the lowermost article out of engagement with the track and thus the whole of the time that the lowermost article is engaged by the rotatable member it is subjected to such a force which is constantly tending to disengage the article from the track. Moreover, the feed member is rotating at constant, high, speed during the whole of the time that it is engaged with the lowermost article. This ensures that the above described frictional force is applied for a relatively long period to the lowermost article. It is particularly to be noted that the lowermost article is engaged by the "land" between the grooves of the rotatable member for a significant period of time before it becomes engaged with the groove and is thus subject to the above described frictional force tending to disengage the article from the track for a significant time before the article becomes engaged with the groove for actual feeding.

BRIEF DESCRIPTION OF THE DRAWINGS

The invention will now be described in more detail by way of example with reference to the drawings wherein.

DESCRIPTION OF THE PREFERRED EMBODIMENT

Figure 1:
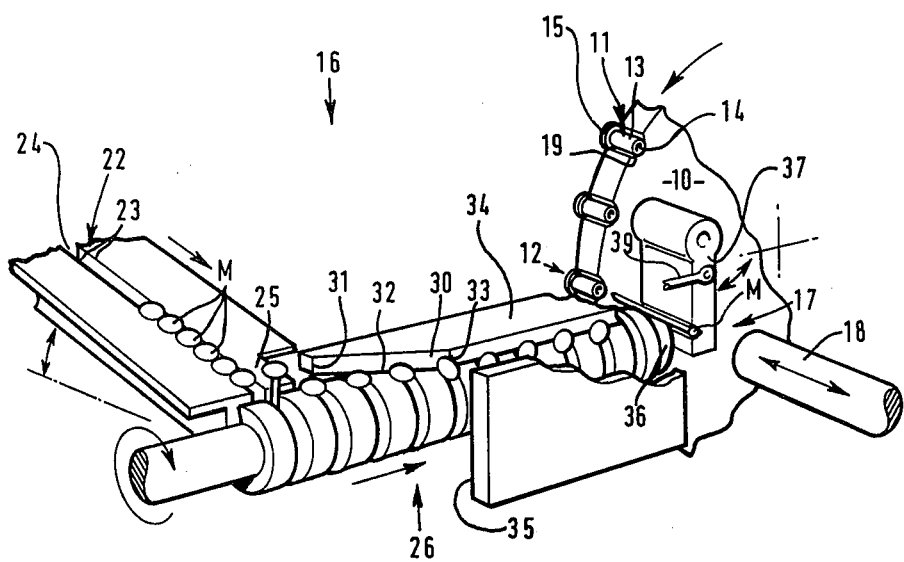
FIG. 1 is a perspective view of part of a machine for assembling blind rivets incorporating a feed means embodying the invention.

Referring to the drawings, a machine for assembling blind rivets is illustrated and comprises an index disc 10 to bring hollow rivet blanks 11 to an assembly station 12. The hollow rivets 11 are of conventional form and comprise a generally cylindrical shank 13 having a cylindrical bore 14 therein and an enlarged head 15 at one end of the shank.

A feed means 16 is provided to feed headed mandrels in succession in a predetermined orientation to a receiving station 17 from which the mandrels M are displaced by a hammer member 18 into the bores 14 of the rivets 11 at the assembly station 12.

Figure 3:
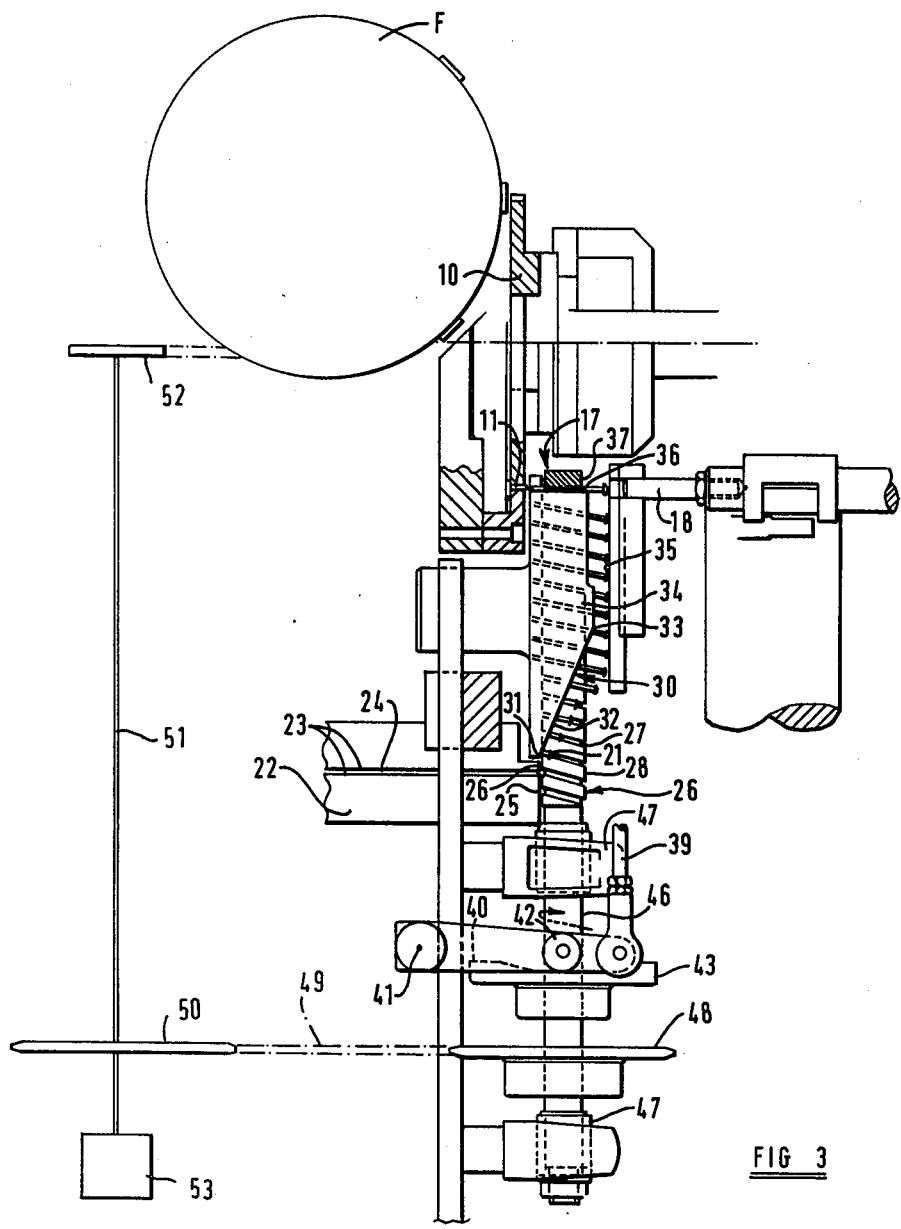
FIG. 3 is a plan view of part of the machine of FIG. 1.

As best shown in FIG. 3, the rivets 11 are fed from a conventional indexing disc F to the periphery of the index disc 10 where they are received in notches 19 formed in the circumference of the disc 10 and are thus tansported, as illustrated best in FIG. 1, to the assembly station 12.

The headed mandrels M, which comprise a cylindrical shank 20 having an enlarged head 21 at one end thereof, are fed from a vibratory feeder, not shown, in a conventional manner, into a feed track 22 comprising a pair of spaced parallel shoulders 23 with a slot 24 therebetween. The feed track 22 is inclined at an angle to the horizontal and the mandrels M engage the shoulders 23 with the undersides of the heads 21 with the shank 20 depending downwardly through the slot 24. The mandrels M accumulate at the lower end 25 of the track 22 and are there engaged by a feed member 26 which causes them to be fed so as to be presented at the receiving station 17 singly, in succession, and with their shanks lying in a horizontal plane and in a plane normal to the axis of rotation of the feed member 26.

Figure 2:
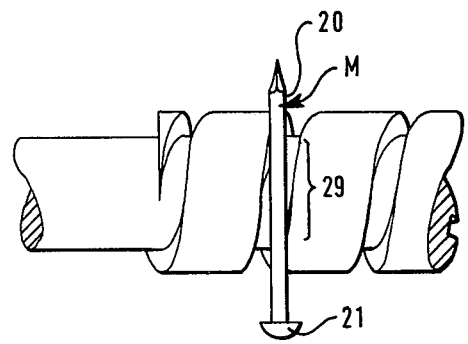
FIG. 2 is a view of part of a feed member of the machine of FIG. 1 shown to an enlarged scale.

As best seen in FIG. 3, the lower end 25 of the track 22 has a transversely extending surface 26 on the downstream side of the slot 24 and the feed member 26 is of generally cylindrical surface configuration but provided with a helical groove 27. The lands 28 between successive turns of the groove 27 are arranged so as to be closely spaced from the surface of the member 26 and the groove 27 is arranged to be of such dimension as to accommodate the shanks 20 of the mandrels M but to be of smaller width than the heads 21. In addition, as shown in FIG. 2, the part of the groove 27 which is aligned with the slot 24 is locally widened as indicated at 29 so as to permit of the head 21 partly entering the widened portion 29 of the groove for a purpose hereinafter described.

An orientating abutment surface 30 extends from a position 31 adjacent the downstream end of the surface 26 and is bounded at its lower end by a horizontal edge 32 which extends in a horizontal plane from a position 31 to a position 33 on the opposite side of the member 26 to the position 31.

Downstream of the position 33 the undersurface of a member 34 on which the surface 30 is provided acts as a guide surface to maintain the mandrels in a horizontal orientation.

A retaining surface 35 is provided extending in a vertical plane parallel to the axis of rotation of the member 26 to engage the heads 21 of the mandrels M as shown in FIGS. 1 and 3 to maintain them in engagement with the feed member 26.

The end turn of the groove 27 at the downstream end of the feed member 26 is of circular configuration as opposed to helical and is provided with only one side wall on the upstream side thereof as indicated at 36.

A pivoted jaw member 37 is provided adapted to engage the shank 20 of a mandrel M at the receiving station 17 to urge it against the wall 36 and thus to maintain the mandrel M with the longitudinal axis of its shank 20 extending in a horizontal plane and in a direction normal to the member 26. The mandrel is permitted to be moved by a reciprocating hammer member 18 by means (not shown) so as to engage the head 21 of a mandrel M, when the member 37 is pivoted out of the way, to the left in FIG. 3, so that the shank 20 is partially received within the bore 13 of a rivet 11 at the assembly station 12.

A link 39 is connected to the pivoted jaw member 37 at one end and to an arm 40 at its other end which is pivoted to the body of the machine at 41 and carries a roller 42 which engages a cam 43 carried on a shaft 46. Thus as shaft 46 rotates, the member 37 is sequentially moved to the position shown in FIG. 1, and then moved out of the way of mandrel M as it is partially driven into the rivet 11 by the hammer member 18. The shaft 46 also carries the feed member 26 and is journalled in bearings 47 and driven via a sprocket 48 by a chain 49 from a sprocket 50 on a primary drive shaft 51 of the apparatus. The index disc 10 is driven from the primary shaft 51 through a drive chain 52. The primary shaft 51 is rotated by a motor 53 at a speed such that the shaft 46 rotates at least at 300 r.p.m. In normal operation of the apparatus the shaft 46 is rotated at least at 1000 r.p.m.

In use of the machine, the rivets 11 and mandrels M are are fed from indexing disc F into the notches 19 of the index disc 10 and the mandrels M are fed from the vibratory feeder into the feed track 22. The index disc 10 and feed member 26 are driven so that a rivet and mandrel arrive simultaneously at the assembly and receiving stations and the member 37 moves out of the way of the hammer member, shortly afterwards, to enable the mandrel M to be driven.

The lowermost mandrel M in the track 22 is pressed by the force of gravity and the pressure of other mandrels in the track 22 against the feed member 26 and is initially in engagement with the land 28 but because the feed member is rotating in the direction illustrated by the arrows in FIG. 1, the frictional force created between the land 28 and the lowermost mandrel M tends to cause relative movement between the lowermost mandrel and the next adjacent mandrel in the track, in the direction of their longitudinal axes so as to tend to lift the lowermost mandrel relative to the adjacent mandrel and therefore tending to free the lowermost mandrel from the remaining mandrels. When the portion 29 of the groove 27 becomes aligned with the slot 24, the lowermost mandrel enters the slot and the widened part 29 creates a wedging engagement with the mandrel giving an increased force tending to lift the mandrel out of engagement with the next adjacent mandrel and this is particularly effective to control the lower end of the operating speed range, i.e. towards 300 r.p.m. Moreover, since the shanks 20 of the mandrels M are lying in, or substantially in, a vertical plane extending longitudinally of the slot 24, they are not aligned with the helix angle of the groove 26 and the locally widened part 29 permits of engagement of the shank within the groove despite this misalignment for a sufficient extent for the mandrel to become disengaged from the slot 24 and thus free to adopt the helix angle.

As the feed member 26 continues to rotate, because of engagement between the shank 20 and the surface 26, the mandrel is constrained to move transversely away from the slot 24. In addition the weight of the mandrel also tends to maintain the head of the mandrel in engagement with the groove despite frictional forces tending to lift the mandrel out of engagement with the surface 26.

On continued transverse movement of the mandrel the shank and head engage the hereinbefore described edge 32 and are thus constrained to move, as illustrated best in FIG. 1, from a substantially vertical orientation to a horizontal orientation at the point 33 where the heads 21 are caused to engage the surface 35 and to remain in engagement therewith to be maintained in a horizontal orientation by engagement with the undersurface of the member 34 until they enter the last turn 36 of the groove and are then engaged by the jaw member 37 and so are held in the above described position where they lie in a horizontal plane with their axes normal to the feed member 26. As the hammer member 18 is caused to engage the head 21 to move the mandrel M into the bore of a rivet 11 at the assembly station 12 the cam 43 causes the jaw member 37 to move out of engagement with the mandrel to permit of the hammer 18 displacing the head 21 of the mandrel past the jaw member 47.

In the above example the feed means 16 has been described as being an integral part of a machine for assembling blind rivets and should be appreciated that a feed means embodying the present invention may be used for any purpose where it is desired to feed elongate headed articles in succession and in a predetermined orientation. The orientation may be that naturally adopted by the articles as they engage the feed member 26 on leaving the track 22 without the provision of any orientating surface as described above. Of course where it is desired to orientate the articles in a direction other than horizontal, the orienting surface would be contoured accordingly to cause the desired extent of rotation of the articles about the axis of the feed member.

It has been found that a feed means embodying the present invention works consistently well and is unaffected by incidental short or bent articles. It is considered that this is due partly to the lifting action afforded by the rotation of the feed member 26 described above and also due to the relatively short region of contact between the feed member and article. Furthermore, because of the transversely moving nature of the groove 27, orientation of an article in said transverse direction is not critical since the article can be engaged by the groove 27 as the groove passes the article even though the article is not precisely aligned with the centre of the slot 23. This avoids the need for a complex design of feed track necessary with prior arrangements where it has been essential for the shanks of the articles to be precisely oriented in said transverse direction. This has led in prior tracks to problems of articles jamming where the articles are bent.

We claim:

1. A feed means for feeding elongate articles comprising an elongate shank having an enlarged head at or adjacent one end thereof in succession and in a predetermined orientation to a receiving station, the feed means including an inclined track comprising a pair of parallel shoulders affording a slot therebetween so that, in use, a head of an article of the type described can be supported on the shoulders with its shank depending downwardly through the slot and, at the lower end of the slot, there being a rotatable feed member having a helical groove of such configuration as to permit a lowermost article in the track to enter the groove and be transported transversely away from the track between the feed means and the lower end of the track, wherein the last turn of the groove of the feed member is circular so that whilst an article is engaged with the last turn it is not transported in said transverse direction and wherein a drive means is provided to rotate the feed member unidirectionally at a speed of at least 300 r.p.m. so that the lowermost article is subjected to a frictional force having a component generally parallel to the longitudinal axis of the shank of a magnitude to cause relative movement between the lowermost article and the next adjacent article in the longitudinal direction of their shanks and thereafter to transport the thus engaged article in a direction transverse to the axis of the shank.

2. A feed means according to claim 1 wherein an abutment surface is provided adjacent the feed member downstream of the track of such configuration as to cause the articles to rotate circumferentially around the axis of rotation of the feed member from the orientation they have when first engaged with the feed member to an orientation in which the shanks of the articles lie in a generally horizontal plane.

3. A feed means according to claim 2 wherein the abutment surface provides an edge extending in a generally horizontal plane from a position adjacent the end of the track in a direction inclined transversely and longitudinally of the feed member to a position on the transversely opposite side of the feed member to the track.

4. A machine for assembling a blind rivet comprising a hollow rivet and a mandrel comprising an elongate shank with a head at one end, said machine including a feed means comprising an inclined track comprising a pair of parallel shoulders affording a slot therebetween so that, in use, a head of a mandrel is supported on the shoulders with its shank depending downwardly through the slot and, at the lower end of the track, a feed member mounted for rotation and having a helical groove therein of such configuration as to permit a mandrel to enter the groove and to be transported along the groove between the feed member and the lower end of the track in a transverse direction and there being an abutment surface adapted to engage a mandrel to move the mandrel from the orientation it has when it becomes engaged with the feed member to a generally horizontal orientation at a receiving station to which it is transported by the feed member, means to feed in succession a plurality of said hollow rivets to an assembly station, and means to move a mandrel in its axial direction out of engagement with the feed member and into a hollow rivet presented thereto at the assembly station.

5. A machine according to claim 4 wherein drive means is provided to rotate the feed member unidirectionally at a speed of at least 300 r.p.m. so that the lowermost article is subjected to a frictional force having a component generally parellel to the longitudinal axis of the shank to cause relative movement between the lowermost article and a next adjacent article in the longitudinal direction of their shanks and thereafter to transport the thus engaged article in a direction transverse to the axis of the shank.

6. A machine according to claim 4 wherein the means for feeding the hollow rivets feeds the rivets so that they are presented at the assembly station with their hollow bores extending in a horizontal direction normal to the feed member.

7. A machine according to of claim 4 wherein the last turn of the groove of the feed member is circular so that whilst a mandrel is engaged with the last turn it is not transported in said transverse direction and hence remains in a position so as to be aligned with a rivet and to permit it to be driven into the rivet.

8. A machine according to claim 4 wherein guide means are provided to engage the mandrel at the receiving station to guide the mandrel whilst it is driven into the rivet.

9. A machine according to claim 8 wherein the end turn of the groove has only one side wall on the upstream side of the groove, said guide means engaging the mandrel on the downstream side thereof to cause the mandrel to be guided between the guide means and said upstream side wall so that the shank of the mandrel extends in a horizontal plane and in a plane perpendicular to the axis of rotation of the feed member for driving into the rivet.

10. A machine according to claim 9 wherein the guide means is reciprocable into and out of engagement with a mandrel so as to be moved out of engagement with the mandrel as the head of the mandrel is moved past the guide member towards the rivet.

11. A feed means for feeding elongate articles comprising an elongate shank having an enlarged head at or adjacent one end thereof in succession and in a predetermined orientation to a receiving station, the feed means including an inclined track comprising a pair of parallel shoulders affording a slot therebetween so that, in use, a head of an article or the type described can be supported on the shoulders with its shank depending downwardly through the slot and, at the lower end of the slot, there being a rotatable feed member having a helical groove of such configuration as to permit a lowermost article in the track to enter the groove and be transported transversely away from the track between the feed member and the lower end of the track, wherein the portion of the groove which becomes aligned with the lower end of the slot and receives the lowermost article mandrel is widened locally to permit of the article entering the groove whilst being orientated at 90° to the longitudinal axis of the feed member and hence not aligned with the helix angle of the groove and wherein a drive means is provided to rotate the feed member unidirectionally at a speed of at least 300 r.p.m. so that the lowermost article is subjected to a frictional force having a component generally parallel to the longitudinal axis of the shank of a magnitude to cause relative movement between the lowermost article and the next adjacent article in the longitudinal direction of their shanks and thereafter to transport the thus engaged article in a direction transverse to the axis of the shank.

12. A feed means according to claim 1 wherein the feed member is mounted for rotation about an axis transverse to the direction of feed of the mandrels along the track.

13. A feed means according to claim 11 wherein the feed member is mounted for rotation about an axis transverse to the direction of feed of the mandrels along the track.

14. A machine according to claim 4 wherein the feed member is mounted for rotation about an axis transverse to the direction of feed of the mandrels along the track.

* * * * *

UNITED STATES PATENT AND TRADEMARK OFFICE
CERTIFICATE OF CORRECTION

PATENT NO. : 4,480,382
DATED : November 6, 1984
INVENTOR(S) : Leonard Haigh et al.

It is certified that error appears in the above-identified patent and that said Letters Patent is hereby corrected as shown below:

Column 4, line 44 delete "tansported" and insert -- transported--.

Column 5, line 56 delete first "are".

Column 7, line 43 after numeral 1 insert --or claim 11--.

Column 8, line 11 after numeral 4 insert --or claim 14--.

Column 8, line 21 after numeral 4 insert --or claim 14--.

Column 8, line 26 after numeral 4 insert --or claim 14--.

Column 8, line 32 after numeral 4 insert --or claim 14--.

Signed and Sealed this

Fourteenth Day of May 1985

[SEAL]

Attest:

DONALD J. QUIGG

Attesting Officer

Acting Commissioner of Patents and Trademarks